(12) United States Patent
Tanaka

(10) Patent No.: US 8,531,742 B2
(45) Date of Patent: Sep. 10, 2013

(54) SHEET DETECTING DEVICE, DOUBLE FEED DETERMINING DEVICE, AND IMAGE READING APPARATUS USING THE SAME

(75) Inventor: Nobuyuki Tanaka, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 259 days.

(21) Appl. No.: 13/169,536

(22) Filed: Jun. 27, 2011

(65) Prior Publication Data

US 2011/0317230 A1 Dec. 29, 2011

(30) Foreign Application Priority Data

Jun. 25, 2010 (JP) ................. 2010-145668

(51) Int. Cl.
*H04N 1/04* (2006.01)
*G06F 3/12* (2006.01)
*B65H 7/08* (2006.01)
*B65H 1/18* (2006.01)
*B65H 7/02* (2006.01)
*B65H 7/12* (2006.01)

(52) U.S. Cl.
USPC .......... 358/498; 358/1.15; 271/110; 271/228; 271/153; 271/262

(58) Field of Classification Search
USPC ................ 358/498, 1.15; 271/110, 228, 153, 271/262
See application file for complete search history.

(56) References Cited

U.S. PATENT DOCUMENTS

| 2004/0100018 | A1* | 5/2004 | Phinney et al. | ............... 271/262 |
| 2004/0145110 | A1* | 7/2004 | Phinney et al. | ............... 271/153 |
| 2008/0259414 | A1* | 10/2008 | Kitagawa et al. | ............. 358/498 |
| 2010/0073711 | A1* | 3/2010 | Pellaton et al. | ............... 358/1.15 |
| 2011/0084443 | A1* | 4/2011 | Iino | ............................. 271/228 |
| 2011/0254219 | A1* | 10/2011 | Helmlinger et al. | .......... 271/110 |

FOREIGN PATENT DOCUMENTS

| JP | A-2004-175570 | 6/2004 |
| JP | 2006-248701 | 9/2006 |
| JP | A-2007-281777 | 10/2007 |

* cited by examiner

*Primary Examiner* — Charlotte M Baker
*Assistant Examiner* — Rury Grisham
(74) *Attorney, Agent, or Firm* — Scully, Scott, Murphy & Presser, PC

(57) ABSTRACT

A sheet detecting device including: an ultrasound generator; a transmitting side opening, which includes a first opening and a second opening to transmit the ultrasound; a transmitting side propagation unit, which is connected to the ultrasound generator and each of the transmitting side openings; a receiving side opening, which includes a third opening and a fourth opening to receives the ultrasound transmitted from the first opening and the second opening; an ultrasound receiver; a receiving side propagation unit, which is connected to each of the receiving side openings and the ultrasound receiver; and a first determining unit, wherein a first distance from the ultrasound generator to the first opening is different from a second distance from the ultrasound generator to the second opening, and wherein a third distance from the ultrasound receiver to the third opening is different from a fourth distance from the ultrasound receiver to the fourth opening.

13 Claims, 16 Drawing Sheets

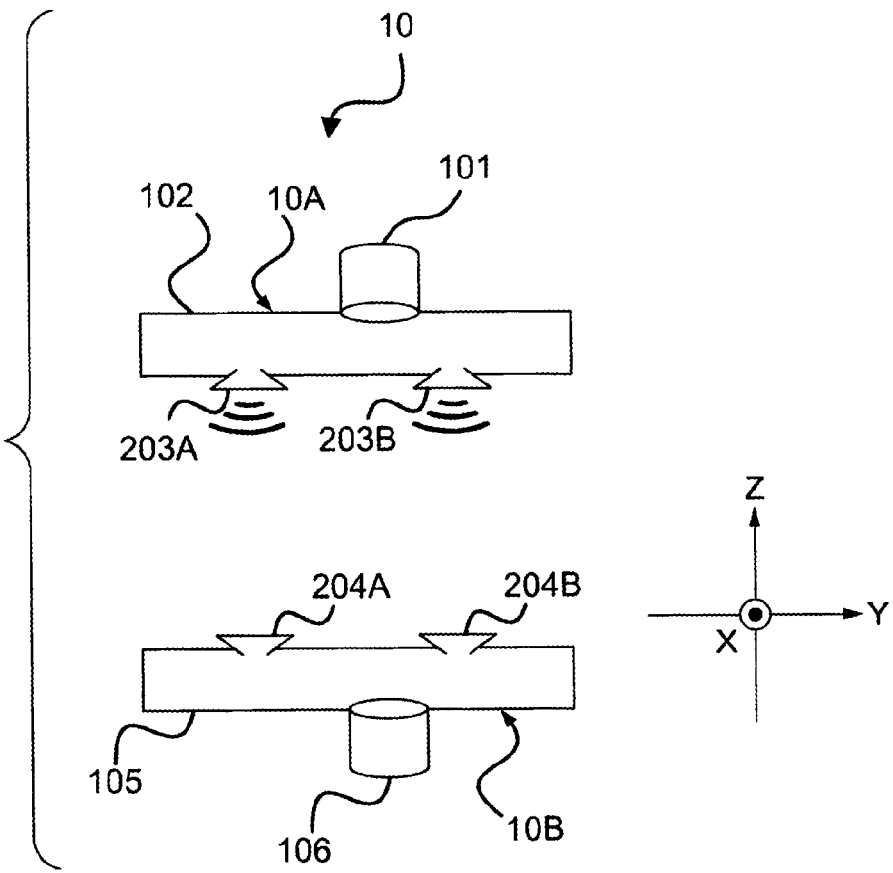

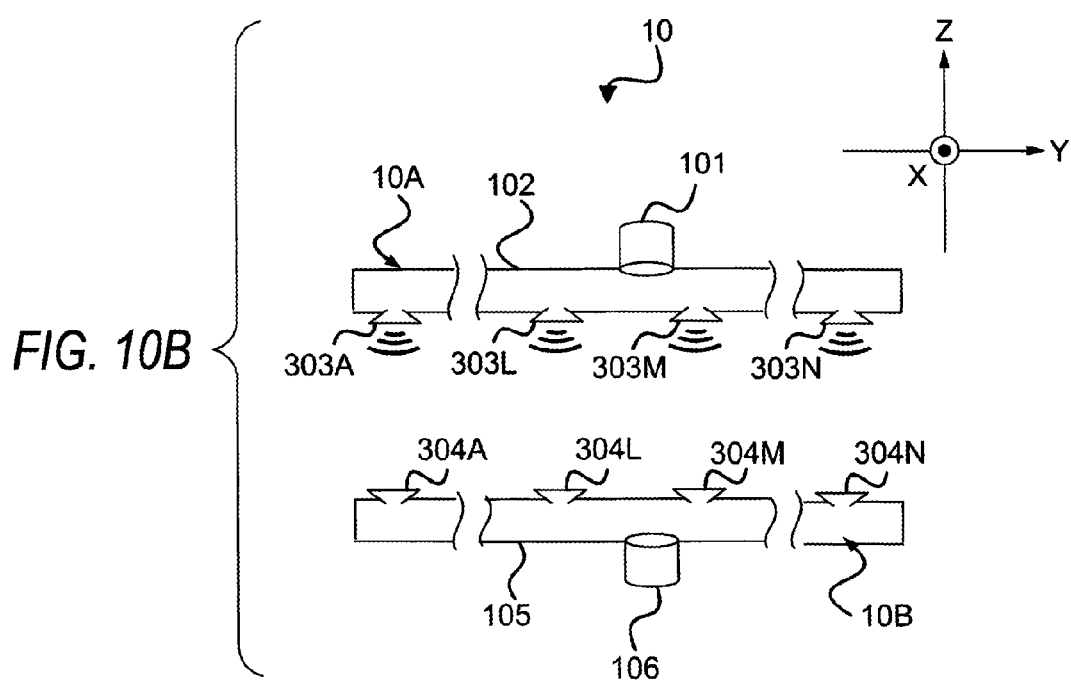

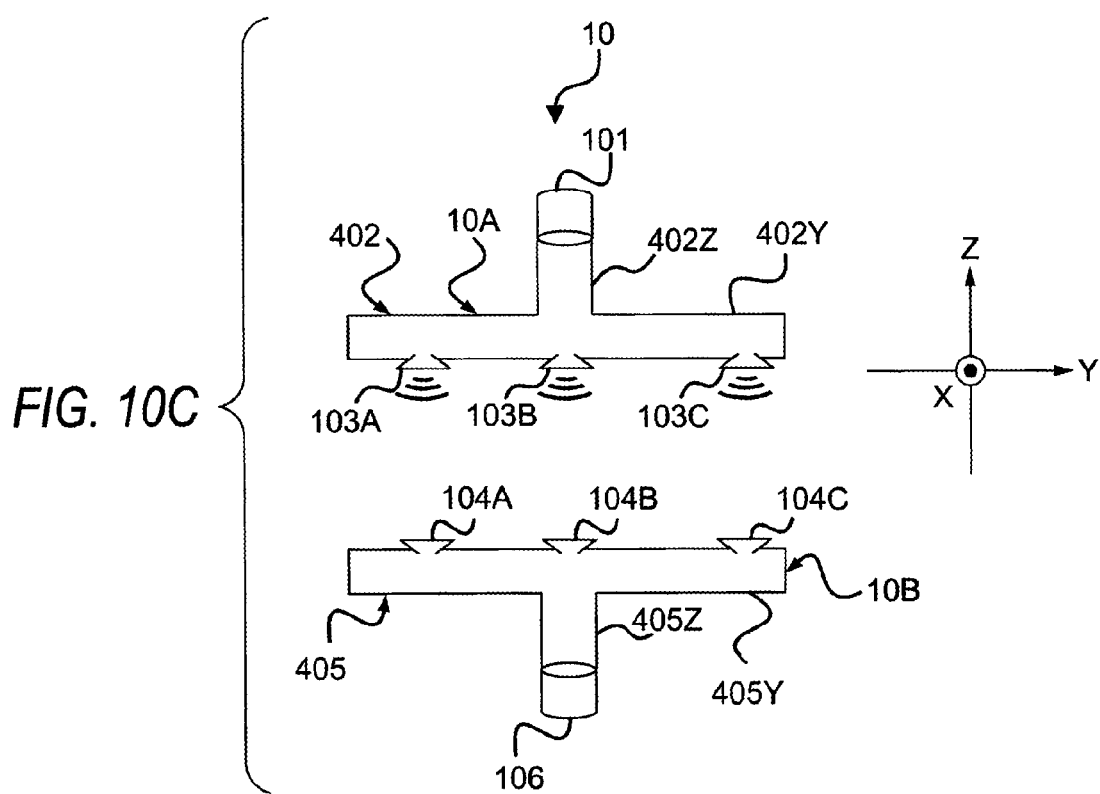

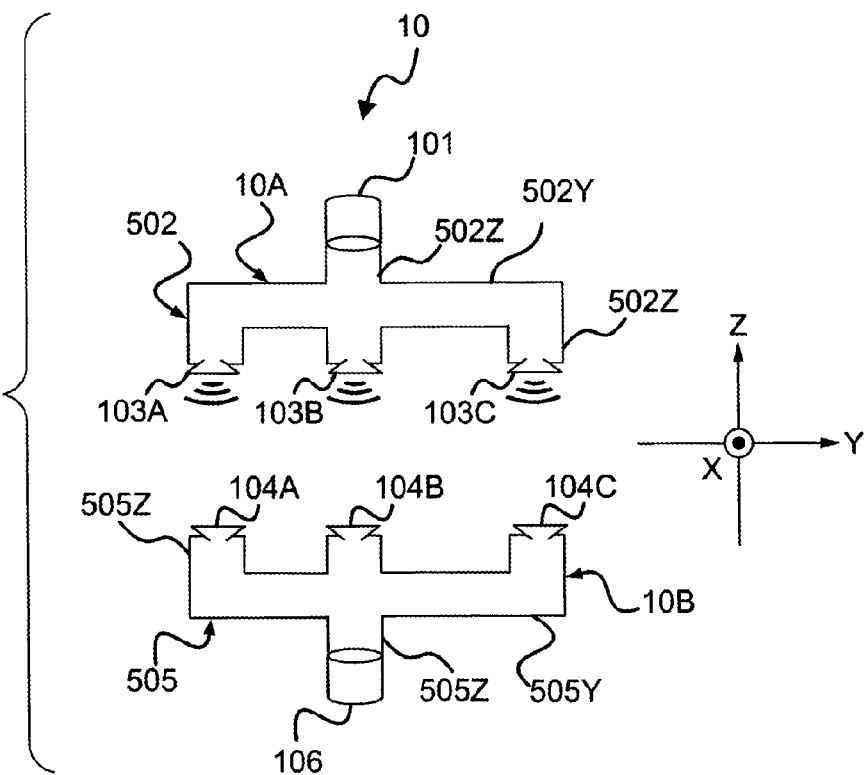

SHEET DETECTING DEVICE, DOUBLE FEED DETERMINING DEVICE, AND IMAGE READING APPARATUS USING THE SAME

CROSS-REFERENCE TO RELATED APPLICATION

This application claims priority from Japanese Patent Application No. 2010-145688 filed on Jun. 25, 2010, the entire subject matter of which is incorporated herein by reference.

BACKGROUND

1. Technical Field

The present invention relates to a sheet detecting device for detecting whether sheets are conveyed and for detecting whether a double feed of the sheets is occurred. The present invention also relates a double feed determining device using the sheet detecting device, and an image reading apparatus.

2. Back Ground

In a related art, a sheet detecting device, which uses ultrasound to determine whether sheets are conveyed and a double feed of the sheets occurred, is proposed. JP-A-2004-175570 discloses a sheet detecting device including a plurality of ultrasound transmitters, a signal transmitter, a plurality of ultrasound receivers and a signal receiver. The signal transmitter transmits the ultrasound to the plurality of ultrasound transmitter. Each of the plurality of ultrasound transmitters transmits the ultrasound toward a conveyed sheet. The plurality of ultrasound transmitters are arranged parallel in a direction perpendicular to a conveying direction of the conveyed sheet. The plurality of ultrasound transmitters are provided to face to each of the plurality of ultrasound transmitters in a direction vertical to a plane of the conveyed sheet, with interposing the sheets. Each of the plurality of ultrasound receivers receives the ultrasound, which reach through the conveyed sheet after transmitted from the plurality of ultrasound transmitters. In this manner, the apparatus disclosed in JP-A-2004-175570 detects the conveyed sheet using the plurality of ultrasound transmitters and the plurality of ultrasonic receivers and determines whether the sheets are conveyed, that is, whether the double feed of sheets occurred, when various sized sheets are conveyed.

SUMMARY

[JP0004]
However, the sheet detecting device disclosed in JP-A-2004-175570 require transmitting timing control of the ultrasound, which are transmitted from the plurality of ultrasound transmitters, to prevent a plurality of the ultrasound from being received by the signal receiver at once.

The present invention is made in consideration of the above. The present invention is to provide a sheet detecting device detecting whether sheets is conveyed and whether a double feed of the sheets occurred, a double feed determining device using the sheet detecting device, and an image reading apparatus, without the transmitting timing control of the ultrasound even when various sized sheets are conveyed.

[JP0006]
With considering the above, a sheet detecting device according to the present invention detects a sheet being conveyed, comprising an ultrasound generator, a transmitting side opening, a transmitting side propagation unit, a receiving side opening, an ultrasound receiver, a receiving side propagation unit, and a first determining unit. The ultrasound generator generates the ultrasound. The transmitting side opening includes a first opening and a second opening to transmit the ultrasound, wherein the transmitting side openings are arranged in an arrangement direction being vertical to a conveying direction, in which the sheet is conveyed, and provided above a face being parallel to a plane of the sheet to be conveyed. The transmitting side propagation unit is connected to the ultrasound generator and the transmitting side opening, and which transfers the ultrasound generated by the ultrasound generator to the transmitting side opening. The receiving side opening includes a third opening and a fourth opening to receive the ultrasound transmitted from the first opening and the second opening, wherein the receiving side openings are arranged in the arrangement direction to face the transmitting side opening. The ultrasound receiver receives the ultrasound received by the receiving side openings. The receiving side propagation unit is connected to each of the receiving side opening and the ultrasound receiver and transfers the ultrasound received by the receiving side opening to the ultrasound receiver. The first determining unit determines amplitude of the ultrasound received by the ultrasound receiver with corresponding to a time point, in which the ultrasound is received by the ultrasound receiver. A first distance from the ultrasound generator to the first opening is different from a second distance from the ultrasound generator to the second opening, and a third distance from the ultrasound receiver to the third opening is different from a fourth distance from the ultrasound receiver to the fourth opening.

BRIEF DESCRIPTION OF THE DRAWINGS

FIG. 10A is a front view illustrating the detecting unit according to a modified embodiment of the present invention;

FIG. 10B is a front view illustrating the detecting unit according to a modified embodiment of the present invention;

FIG. 10C is a front view illustrating the detecting unit according to a modified embodiment of the present invention;

FIG. 10D is a front view illustrating the detecting unit according to a modified embodiment of the present invention;

DESCRIPTION OF PREFERRED ILLUSTRATIVE EMBODIMENTS

[JP0031]

Hereinafter, one illustrative embodiment of the present invention will be described in detail with reference to the accompanying drawings.

(Appearance of the Image Reading Apparatus)

Figure 1:
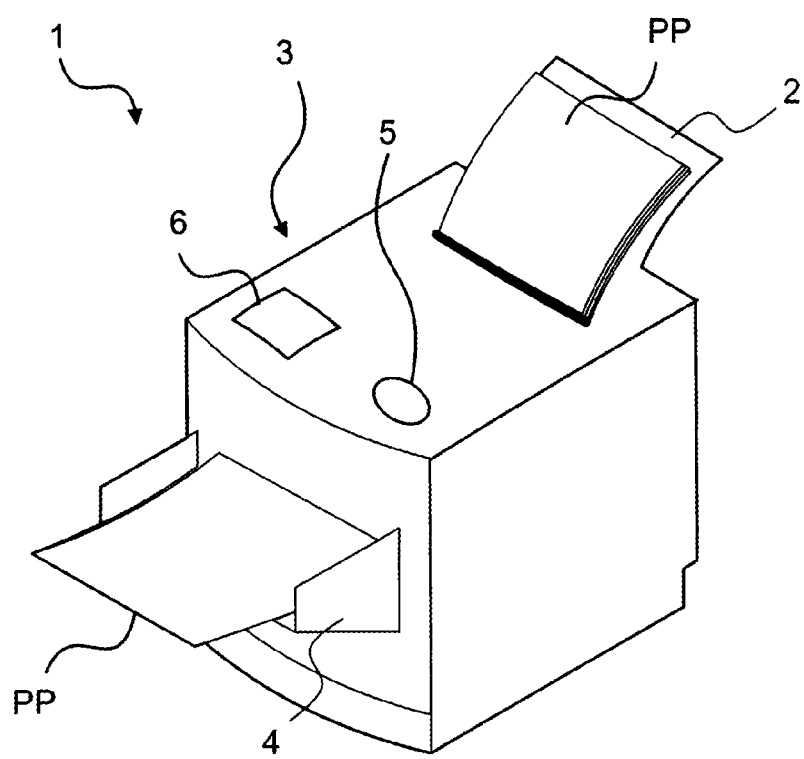
FIG. 1 is a perspective view illustrating an image reading apparatus according to an illustrative embodiment of the present invention.

The image reading apparatus 1, as shown in FIG. 1, includes a sheet feed tray 2, a reading unit 3, a sheet discharge tray 4, a setting unit 5, and a displaying unit 6. The image reading apparatus 1 according to the illustrative embodiment is a sheet feed scanner, which scans and conveys a plurality of sheets PP stacked on the sheet feed tray 2 by a user in the reading unit 3.

The reading unit 3 pulls the sheet PP stacked on the sheet feed tray 2 into an inside of the reading unit 3. The reading unit 3 conveys the pulled sheet PP from the sheet feed tray 2 toward the sheet discharge tray 4 in the inside of the reading unit 3. The reading unit 3 scans an image of the sheet PP being conveyed.

The sheet discharge tray 4 receives the conveyed sheet PP by the reading unit 3. The setting unit 5 includes a power switch and various setting buttons. The setting unit 5 includes a tag position indicating button for indicating a position to which a tag is attached. The tag may be a sticky note, and so on. The displaying unit 6 is configured by a liquid crystal display. The displaying unit 6 is configured to display an image having been scanned by the reading unit 3, etc.

(Inner Configuration of the Image Reading Apparatus)

Figure 2:
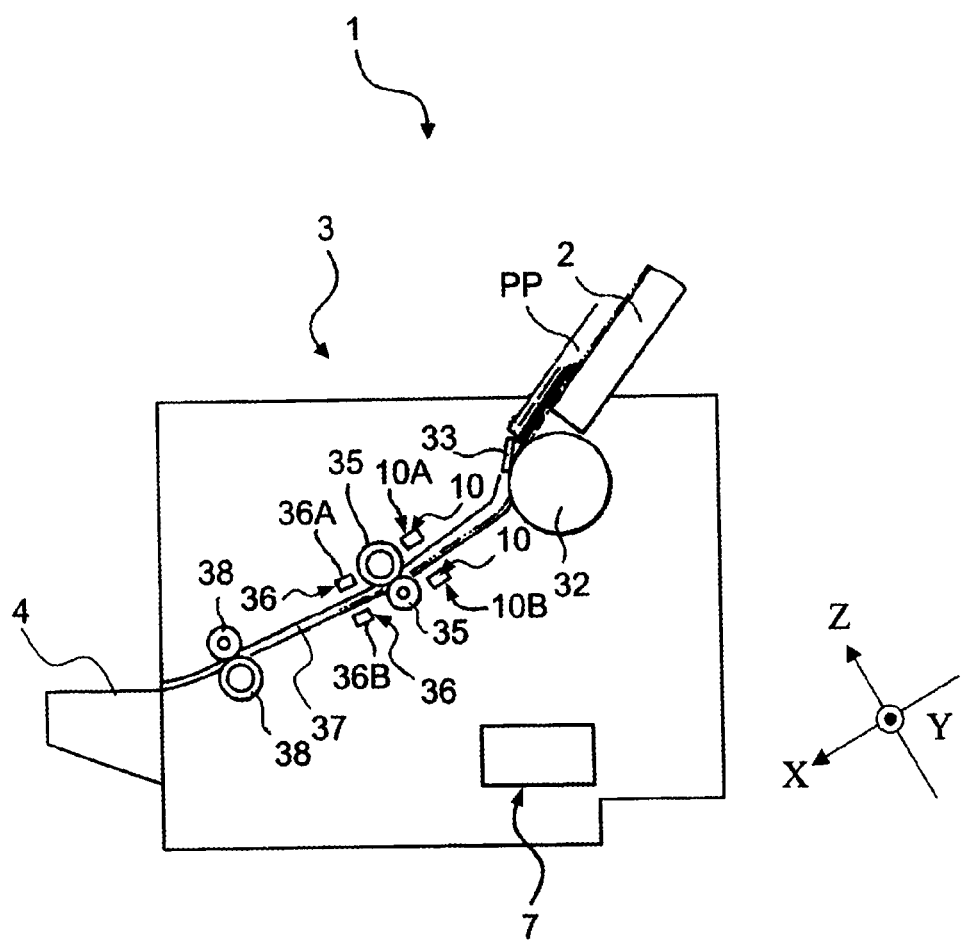
FIG. 2 is a view illustrating an inner configuration of the image reading apparatus.

The image reading apparatus 1, as shown in FIG. 2, includes a pickup roller 32, a separation pad 33, a detecting unit 10, a feed roller 35, a reading sensor 36, a conveyance pass 37, a discharge roller 38 and a control unit 7, within the reading unit 3.

[JP0036]

The pickup roller 32 pulls a plurality of sheets PP stacked on the sheet feed tray 2 by frictional force into the image reading apparatus 1. The pickup roller 32 is drove by a motor (not shown). The separation pad 33 separates a plurality of sheets PP into a small number of sheets by frictional force. It is preferable that the plurality of sheets PP is separated into one sheet PP. However, even when the separation pad 33 exists as a separation unit, a double feed, which is a few sheets PP fed in a stacked state, may occur.

The detecting unit 10 detects the sheets PP being conveyed. The detecting unit 10 is configured by an ultrasound sensor. The detecting unit 10 includes an ultrasound transmitter 10A and an ultrasound receiver 10B. The received ultrasound, which is received by the ultrasound receiver 10B in a case that the ultrasound are transmitted to two or more sheets PP by the ultrasound transmitter 10A and received by the ultrasound receiver 10B, are greatly attenuated compared with a case where one sheet PP is conveyed. The apparatus detects the attenuation of the ultrasound, thereby determining whether a double feed occurred.

Hereinafter, as shown in FIG. 2, an X-axis is defined as a conveying direction of sheets PP, which are conveyed between the ultrasound transmitter 10A and the ultrasound receiver 10B, a Y-axis is defined as a direction perpendicular to the X-axis and parallel to a plane of the sheet PP being conveyed between the ultrasound transmitter 10A and the ultrasound receiver 10B, and a Z-axis is defined as a direction perpendicular to a face of the sheet PP being conveyed between the ultrasound transmitter 10A and the ultrasound receiver 10B. Accordingly, a plane parallel to a plane of sheet PP conveyed between the ultrasound transmitter 10A and the ultrasound receiver 10B is parallel to an X-Y plane. Hereinafter, the term "above" or "front" means a positive direction of the Z-axis indicated by the arrow as shown in FIG. 2, and the term "below" or "back" means a negative direction of the Z-axis indicated by the arrow as shown in FIG. 2. In this manner, the direction of the X-axis, the direction of the Y-axis and the direction of the Z-axis are commonly defined in other drawings.

The feed roller 35 is drove by a motor not shown to convey the sheet PP. The sheet PP is conveyed along the conveyance pass 37.

The reading sensor 36 is configured by a pair of Contact Image Sensors (hereinafter, referred to as CIS) 36A, 36B facing each other. The conveyance pass 37 is positioned between the CIS 36A and the CIS 36B. The reading sensor 36 scans an image of a surface and an image of the other surface of the sheet PP.

The discharge roller 38 is provided at a downstream of the reading sensor 36 in a conveying direction of the sheet PP in the conveyance pass 37. The discharge roller 38 sends the sheet PP conveyed in the conveyance pass 37 to the sheet discharge tray 4. The discharge roller 38 is driven by a motor not shown. The sheet PP is stacked on the sheet discharge tray 4.

The control unit 7 is configured by a computer having CPU, ROM, RAM, flash ROM, etc.

(Appearance of the Detecting Unit)

Figure 3:
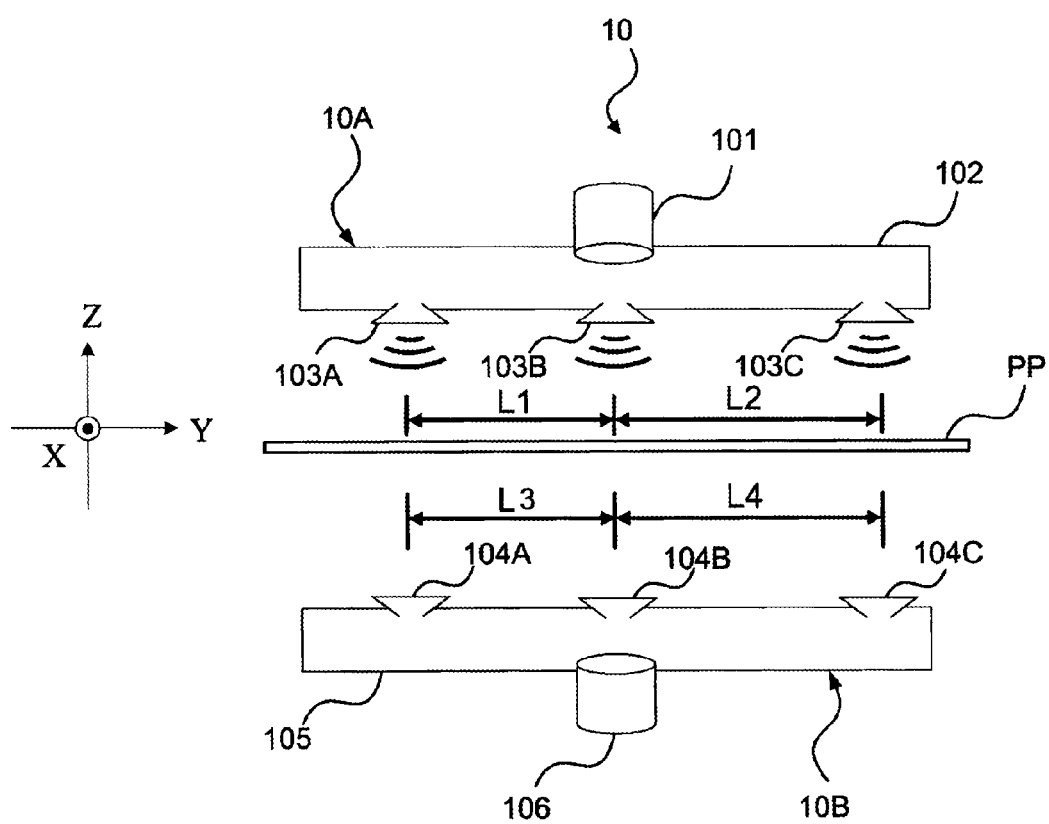
FIG. 3 is a front view illustrating a detecting unit of the image reading apparatus.
Figure 4:
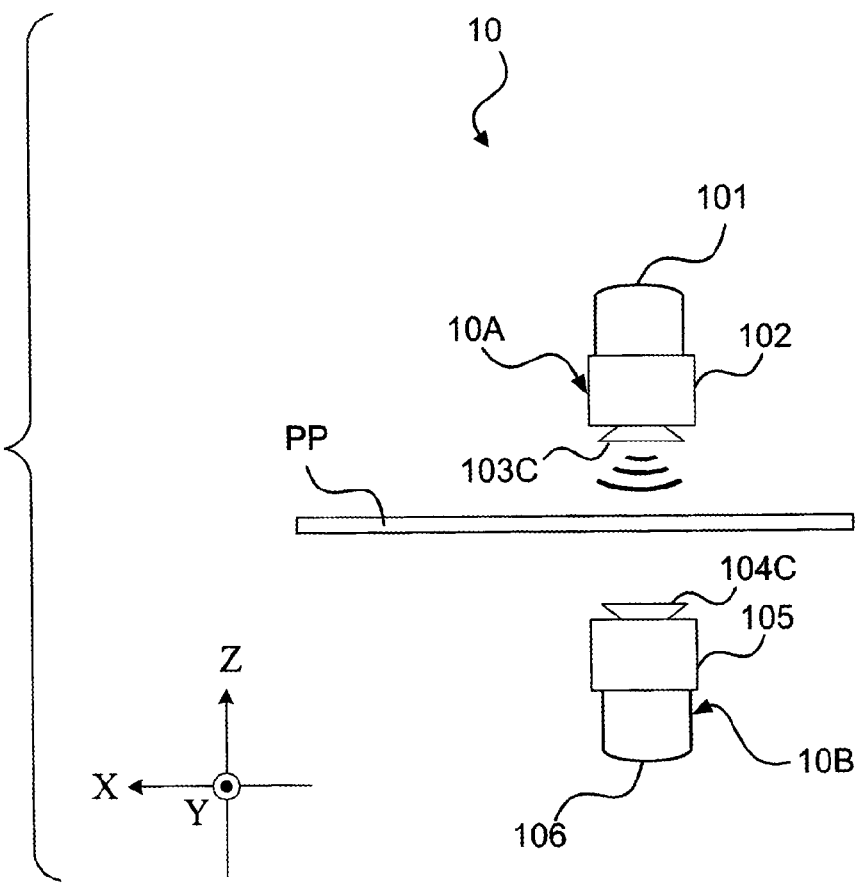
FIG. 4 is a side view illustrating the detecting unit.

The detecting unit 10, as shown in FIG. 3 and FIG. 4, includes an ultrasound transmitter 10A and an ultrasound receiver 10B. The ultrasound transmitter 10A, as shown in FIG. 3, includes an ultrasound generator 101, a transmitting side propagation unit 102, and transmitting side openings 103A, 103B, 103C. The ultrasound receiver 10B, as shown in FIG. 3, includes receiving side openings 104A, 104B, 104C, a receiving side propagation unit 105, and an ultrasound receiving unit 106.

The ultrasound generator 101 generates ultrasound. The transmitting side propagation unit 102 is connected to the ultrasound generator 101 and the transmitting side openings 103A, 103B, 103C. The transmitting side propagation unit 102 transmits the ultrasound generated by the ultrasound generator 101 to the transmitting side openings 103A, 103B, 103C. The transmitting side propagation unit 102, as shown in FIG. 3, is extended in the Y direction. Accordingly, the transmitting side propagation unit 102 transmits the ultrasound generated by the ultrasound generator 101 in the Y-axis direction.

The transmitting side openings 103A, 103B, 103C are arranged in the Y-axis direction as shown in FIG. 3. Each of the transmitting side openings 103A, 103B, and 103C shown in FIG. 3 is provided to direct its opening part to a negative direction of the Z-axis. In FIG. 3, the sheet PP is conveyed toward a positive direction of the X-axis in a state, in which its plane is parallel to the X-Y plane between the ultrasound transmitter 10A and the ultrasound receiver 10B. The transmitting side propagation unit 102 and the transmitting side openings 103A, 103B, 103C are configured by a sound propagation pipe, which has a hollow structure and is made of a hard plastic material, configured to propagate the ultrasound along them.

In this embodiment, a first distance L1 from the ultrasound generator 101 to the transmitting side opening 103A in the Y-axis direction is 40 mm, and a second distance L2 from the ultrasound generator 101 to the transmitting side opening 103C in the Y-axis direction is 50 mm. That is, the first distance L1 is different from the second distance L2. In this case, the first distance L1 is smaller than the second distance L2. Accordingly, a distance from the ultrasound generator 101 to the transmitting side opening 103A in the transmitting side propagation unit 102 is different from a distance from the ultrasound generator 101 to the transmitting side opening 103C in the transmitting side propagation unit 102. Meanwhile, the second distance L2 is smaller than the Y-direction length of a name card sized sheet PP, which has the shortest length in the Y-direction among various predetermined sheets PP to be conveyed. Additionally, the term "predetermined" indicates not a desired size, which is arbitrarily set by cutting sheets by means of scissors and the like, but standardized sizes having A4 size, B5 size, and name card size, etc. Hereinafter, a sheet PP having the smallest length in the Y-direction is referred to as "a minimum size paper". In the illustrative embodiment, a sheet PP having a length of 55 mm in the Y-direction is set as a minimum size. Accordingly, the first distance L1 and the second distance L2 are satisfied with the relation L1<L2<55 mm. That is, both of the first distance L1 and the second distance L2 are smaller than the length of a minimum size paper in the Y-direction. Accordingly, even when the minimum size paper is overlapped and is conveyed with other sheets PP, the minimum size paper is conveyed between at least one of the transmitting side openings 103A, 103B, 103C and the receiving side openings 104A, 104B, 104C. Therefore, even when the minimum size paper is overlapped and conveyed with other sheets PP, the conveyed sheets is accurately detected.

Each of the receiving side openings 104A, 104B, 104C receives the ultrasound that are transmitted through the transmitting side openings 103A, 103B, 103C. When the sheets PP are conveyed between the transmitting side openings 103A, 103B, 103C and the receiving side openings 104A, 104B, 104C, each of the receiving side openings 104A, 104B, 104C receives the ultrasound, which is reached to the receiving side openings 104A, 104B, 104C through the transmitting side openings 103A, 103B, 103C and the sheets PP. The receiving side openings 104A, 104B, 104C are arranged in the Y-direction. Each of the receiving side openings 104A, 104B, and 104C is provided to direct its opening part to the positive direction of the Z-axis, as shown in FIG. 3. Each of the receiving side openings 104A, 104B, and 104C is disposed at the same position as the transmitting side openings 103A, 103B, and 103C in the Y-direction. The transmitting side opening 10313 is disposed at the same position as the ultrasound generator 101 in the Y-direction. The receiving side opening 104B is disposed at the same position as the ultrasound receiver 106 in the Y direction.

As mentioned above, each of the receiving side openings 104A, 104B, 104C is disposed at the same position as the transmitting side openings 103A, 103B, 103C in the Y-direction. Accordingly, a distance from the ultrasound receiver 106 to the receiving side opening 104A in the Y-direction is identical to the first distance L1. A distance from the ultrasound receiver 106 to the receiving side opening 104C in the Y-direction is identical to the second distance L2. Accordingly, the distance from the ultrasound receiver 106 to the receiving side opening 104A in the Y-direction differs from the distance from the ultrasound receiver 106 to the receiving side opening 104C in the Y-direction. That is, the distance from the receiving side opening 104A to the ultrasound receiver 106 differs from the distance from the receiving side opening 104C to the ultrasound receiver 106, in the receiving side propagation unit 105.

The receiving side propagation unit 105 is connected to each of the receiving side openings 104A, 104B, 104C and the ultrasound receiver 106. The receiving side propagation unit 105 shown in FIG. 3 is extended in the Y-direction. Accordingly, the receiving side propagation unit 105 can transfer the ultrasound received by the receiving side openings 104A, 104B, and 104C in the Y-direction. The receiving side propagation unit 105 transfers the ultrasound received by the receiving side openings 104A, 104B, and 104C to the ultrasound receiver 106. The ultrasound receiver 106 receives the ultrasound received by the receiving side openings 104A, 104B, and 104C. The receiving side propagation unit 105 and the receiving side openings 104A, 104B, and 104C are configured by a sound propagation pipe, which has a hollow structure and is made of a hard plastic material, configured to propagate the ultrasound along them.

As shown in FIG. 3, The ultrasound transmitter 10A and the ultrasound receiver 10B face each other in the Z-direction with the sheet PP interposed between them, when the sheets PP are conveyed between the transmitting side openings 103A, 103B, 103C and the receiving side openings 104A, 104B, and 104C. Along the X-axis As shown in FIG. 4, the ultrasound transmitter 10A and the ultrasound receiver 10B are arranged at the same position in the X-direction.

Figure 5:
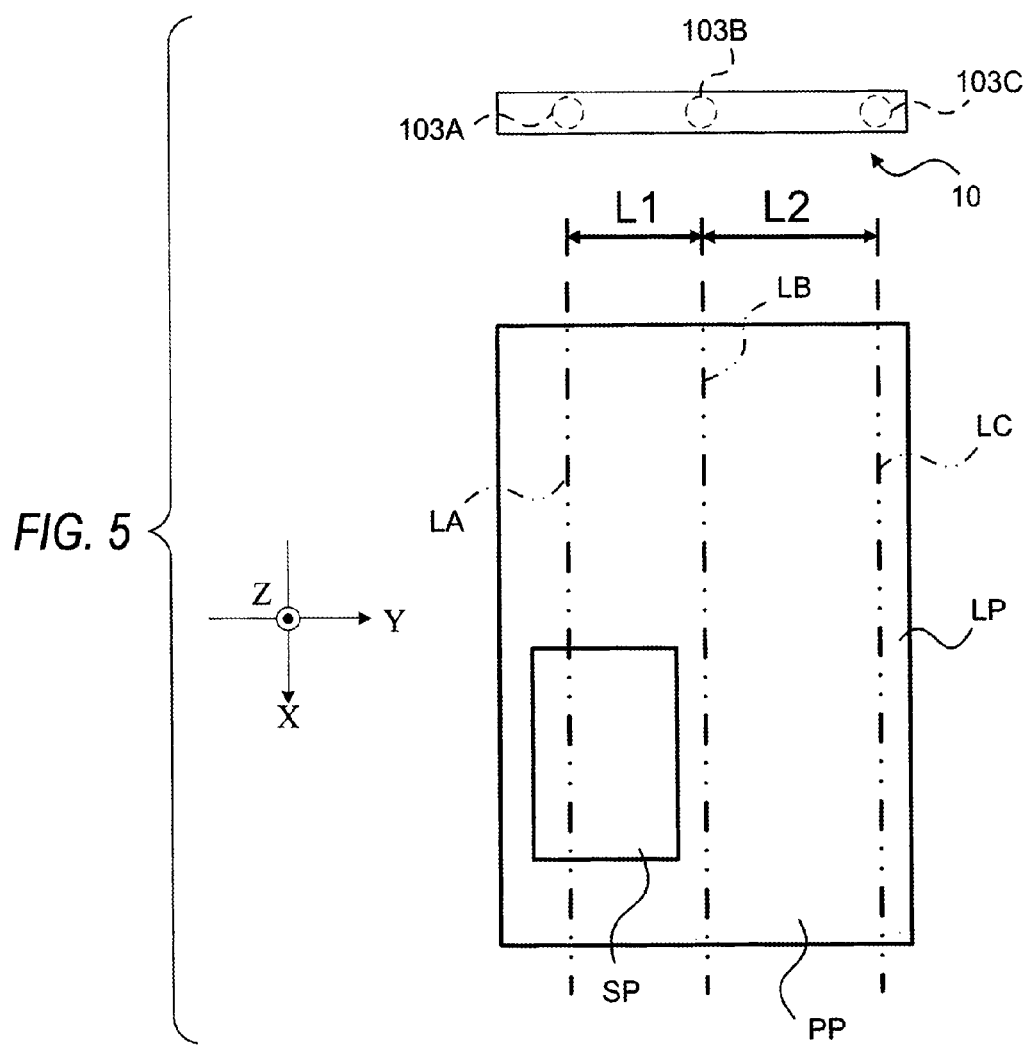
FIG. 5 is a view illustrating a detection of a sheet by the detecting unit.

The detection of the sheets PP by the detecting unit 10 will be described with reference to FIG. 5. In this situation shown in FIG. 5, the sheets PP are conveyed in a state that a sheet LP, which has a relatively large size, and a sheet SP, which of size is smaller than the sheet LP, are overlapped. in this case, while the sheet PP is being conveyed in a positive direction of the X-axis, the ultrasound are transmitted from the transmitting side openings 103A, 103B, 103C to the sheet PP. Accordingly, the ultrasound are transmitted to the sheet PP along the lines LA, LB and LC, which are indicated by two-dot chain lines shown in FIG. 5. The ultrasound transmitted along the line LA is remarkably attenuated when transmitted through a position where the sheet LP and the sheet SP are overlapped. Accordingly, since the attenuation of the ultrasound is detected at a position where the sheet SP and the sheet LP are overlapped, it possible to determine that the double feed of the sheet PP occurred. Meanwhile, when the detecting unit 10 transmit the ultrasound to the sheets PP only along line LB, since the ultrasound are not transmitted through a position where the sheet SP and the sheet LP are overlapped, the detecting unit fails to detect the occurrence of the double feed. However, since the detecting unit 10 according to the illustrative embodiment has the three transmitting openings and the three receiving openings, such as the transmitting side openings 103A, 103B, 103C and the receiving side openings 104A, 104B, 104C, the detecting unit 10 can transmit the ultrasound to the sheets PP along the three lines of LA, LB and LC. Accordingly, as shown in FIG. 5, even when various sized sheets PP are conveyed, the detecting unit can accurately detect the occurrence of the double feed.

Figures 6A, 6B, 6C:
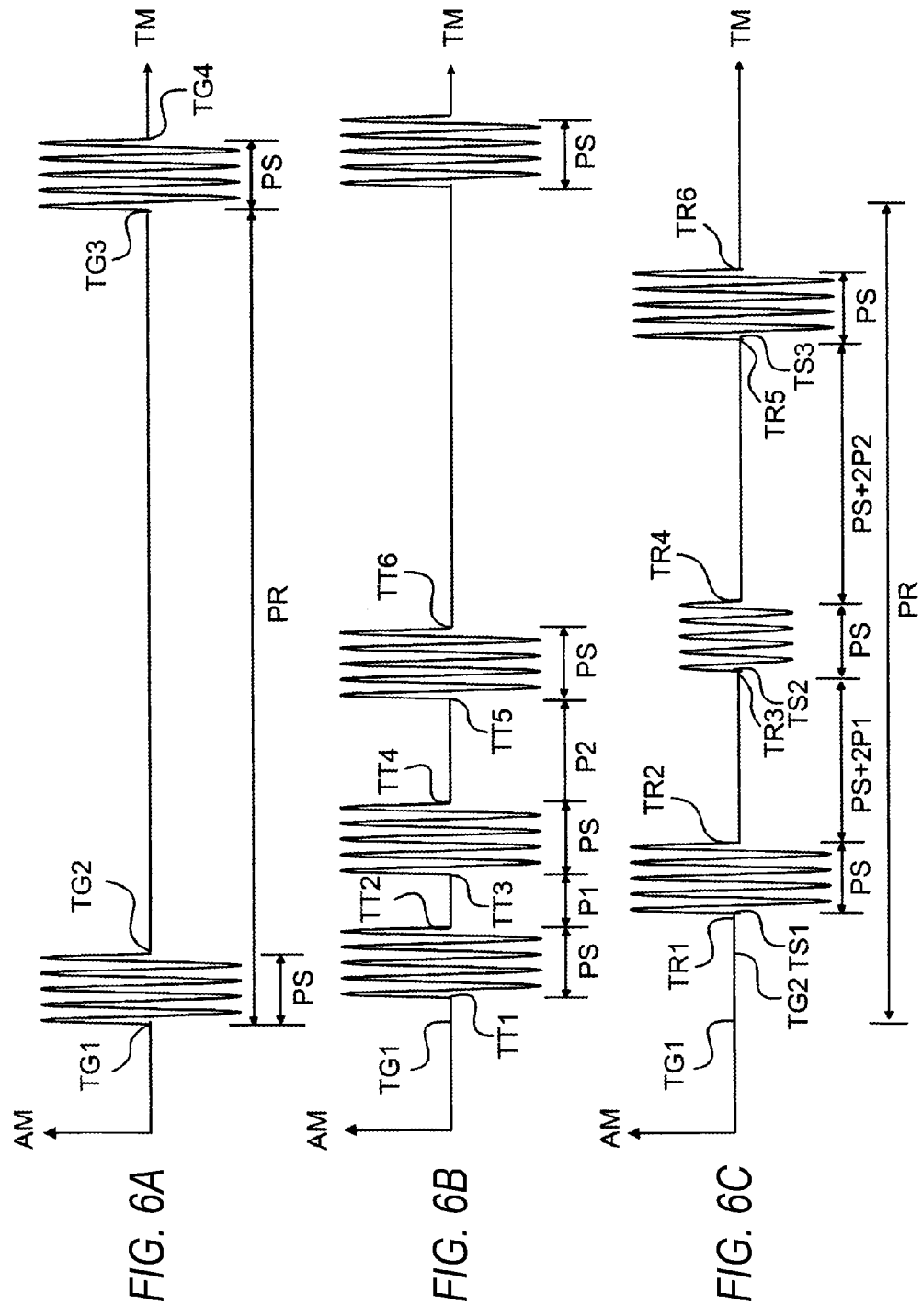
FIGS. 6A to 6C are views illustrating a generation, transmission, and reception of the ultrasound.

The ultrasound generated by the ultrasound generator 101 and the ultrasound received by the ultrasound receiver 106 will be described with reference to FIGS. 6A to 6C. In FIG. 6A the horizontal axis indicates time TM when the ultrasound are generated by the ultrasound generator 101. The vertical axis indicates amplitude AM of the ultrasound generated by the ultrasound generator 101. In FIG. 6B, the horizontal axis indicates time TM when the ultrasound are transmitted from the transmitting side openings 103A, 103B, 103C. The vertical axis indicates amplitude AM of the ultrasound transmitted from the transmitting side openings 103A, 103B, 103C. In FIG. 6C, the horizontal axis indicates time TM when the ultrasound are received by the ultrasound receiver 106. The vertical axis indicates amplitude AM of the ultrasound received by the ultrasound receiver 106. In FIGS. 6A, 6B, and 6C, the time TM is indicated as a common time axis, the amplitude AM is indicated by as a common scale. That is, for instance, a time point TG1 indicated in FIG. 6A is same time as the time TM in a time point TG1 indicated in FIGS. 6B and 6C.

First, the ultrasound generated by the ultrasound generator 101 in a time frame TG1-TG2 as shown in FIG. 6A are transmitted from the transmitting side opening 103B placed in a negative direction side of the Z-axis of the ultrasound generator 101 in the time frame TT1-TT2 as shown in FIG. 6B. Meanwhile, hereinafter, the time between the time point TG1 and the time point TG2 is indicated as "time frame TG1-TG2", for example. The ultrasound is transferred through the transmitting side propagation unit 102. Since the first distance L1 is smaller than the second distance L2, the ultrasound transmitted through the transmitting side propagation unit 102 are transmitted from the transmitting side opening 103A in the time frame TT3-TT4 as shown in FIG. 6B. Thereafter, the ultrasound is transmitted from the transmitting side opening 103C in the time frame TT5-TT6. In this manner, since the distances from the ultrasound generator 101 to each of the transmitting side openings 103A, 103B, and 103C at the transmitting side propagation unit 102 are different from each other, transmitting timings, in which the ultrasound are transmitted from each of the transmitting side openings 103A, 103B, 103C, are lagged without the transmitting timing control of the ultrasound.

The ultrasound transmitted from the transmitting side opening 103B in the time frame TT1-TT2 are received by the receiving side opening 104B. The ultrasound received by the receiving side opening 104B is received by the ultrasound receiver 106 in a time frame TR1-TR2 as shown in FIG. 6C. The ultrasound transmitted from the transmitting side opening 103A in the time frame TT3-TT4 as shown in FIG. 6B are received by the receiving side opening 104A. The ultrasound received by the receiving side opening 104A are transferred through the receiving side propagation unit 105 and received by the ultrasound receiver 106 in the time frame TR3-TR4. In this situation as shown in FIG. 5, when the overlapped sheets of the sheet SP and the sheet LP pass through between the transmitting side opening 103A and the receiving side opening 104A, the remarkably-attenuated ultrasound are received the time frame TR3-TR4 as shown in FIG. 6C. In the time frame TT5-TT6, the ultrasound transmitted from the transmitting side opening 103C is received by the receiving side opening 104C. The ultrasound received by the receiving side opening 104C are transferred through the receiving side propagation unit 105 and received by the ultrasound receiver 106 in the time frame TR5-TR6. In this manner, since the distances from the ultrasound receiver 106 to each of the receiving side openings 104A, 104B, 104C are different from each other in the Y-axis direction, receiving timings, in which the ultrasound transmitted to each of the receiving side openings 104A, 104B, 104C is received by the ultrasound receiver 106, are lagged without the transmitting timing control of the ultrasound. That is, the ultrasound received by the receiving side openings 104A, 104B, 104C is received by the ultrasound receiver 106, without overlapping to each other. Accordingly, even when various sized sheets are conveyed, the apparatus can detect the sheets conveyed without the transmitting timing control of the ultrasound.

In the time frame TG3-TG4, the ultrasound generator 101 generates a next ultrasound following the ultrasound generated in the time frame TG1-TG2. A time interval PR is a time between in a first time frame TG1-TG2, in which first ultrasound are generated, and a second time frame TG3-TG4, in which second ultrasound are generated.

As shown in FIG. 6A and FIG. 6C, if a time period P1 is a time between time points TT2 and TT3, if a time period P2 is a time between time points TT4 and TT5, and if time frame PS is a time between time points TG1 and TG2, the time interval PR is predetermined so as to satisfy following formula: PR>2×(3×PS+P1+P2). The time interval PR predetermined in this manner is memorized in the ROM provided in the control unit 7, in advance. Meanwhile, since the time PS is an oscillation time of the ultrasound, if a frequency of the ultrasound is a frequency FR, the time PS is equal to a value of the frequency of the ultrasound generated in a one-time transmission divided by the frequency FR. Also, the time period PS+P1, which is sum of the time period PS and the time period P1, indicates a time between a time point that the ultrasound generated by the ultrasound generator 101 is transmitted from the transmitting side opening 103B and a time point that the ultrasound are transmitted from the transmitting side opening 103A. Accordingly, if sound velocity is indicated as velocity SS, the time period PS+P1 as shown in FIG. 6B satisfies the following equation: PS+P1=L1/SS. Similarly, the time period PS+P2, which is a total time from a time point that the ultrasound generated by the ultrasound generator 101 are transmitted from the transmitting side opening 103A to a time point that the ultrasound are transmitted from the transmitting side opening 103C, is determined by the difference between the distance L1 of the ultrasound generator 101 and the transmitting side opening 103A and the distance L2 of the ultrasound generator 101 and the transmitting side opening 103C. That is, the total time PS+P2 shown in FIG. 6B satisfies the following equation: PS+P2=(L2−L1)/SS. Meanwhile, the time difference between the time that takes for the ultrasound received by the receiving side opening 104B to be received by the ultrasound receiver 106 and the time that takes for the ultrasound received by the receiving side opening 104A to be received by the ultrasound receiver 106 is indicated as PS+P1 (=L1/SS). Also, the time difference between the time that takes for the ultrasound received by the receiving side opening 104A to be received by the ultrasound receiver 106 and the time that takes for the ultrasound received by the receiving side opening 104C to be received by the ultrasound receiver 106 is indicated as PS+P2=(L2−L1)/SS. Accordingly, as indicated as time period TR1-TR3 in FIG. 6C, regarding the ultrasound generated from the ultrasound generator 101, the signal received by the ultrasound receiver 106 through the transmitting side opening 103A and the receiving side opening 104A is delayed for 2×(PS+P1), compared with the signal received by the ultrasound receiver 106 through the transmitting side opening 103B and receiving side opening 104B. Also, as indicated as time frame TR1-TR5 in FIG. 6C, regarding the ultrasound generated from the ultrasound generator 101, the signal received through the transmitting side opening 103C and the receiving side opening 104C is delayed for 2×(PS+P1)+2×(PS+P2)=2×(2×PS+P1+P2), compared with the signal received by the ultrasound receiver 106 through the transmitting side opening 103B and receiving side opening 104B. Further, as indicated as time frame TR5-TR6 in FIG. 6C, the time period PS is required to complete the reception of the signal received through the transmitting side opening 103C and receiving side opening 104C. Accordingly, since the time interval PR for generating the ultrasound by the ultrasound generator 101 is predetermined so as to satisfy following formula: PR>2×(3×PS+P1+P2) as shown in FIG. 6C, ultrasound derived from the ultrasound generated at the first time frame TG1-TG2 and ultrasound derived from the ultrasound generated at the second time frame TG3-TG4 can be received by the ultrasound receiver 106 without overlapping. Accordingly, even when various sized sheets are conveyed, the apparatus can accurately detect the sheets conveyed in such a manner.

Figure 7:
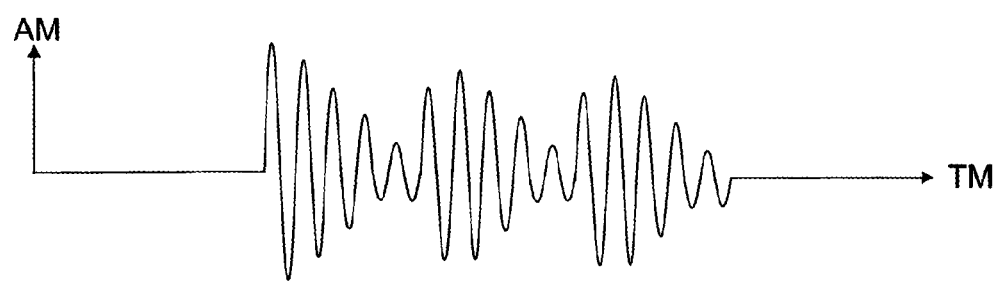
FIG. 7 is a view illustrating an effect of a superposition of the ultrasound and reverberation on a detection accuracy of the sheet.

Meanwhile, the first distance L1 and the second distance L2 are predetermined to be more than half of value obtained by multiplying the reverberation time and sound velocity depending on the configuration of the transmitting side propagation unit 102 and the receiving side propagation unit 105. The reverberation time depends on the configuration of the transmitting side propagation unit 102 and the receiving side propagation unit 105, that is, a structure or material of the sound propagation pipe. In the detector 10 in the illustrative embodiment, the reverberation time is 200 µs. According to the present aspect, the sound velocity is 346.75 m/s. Accordingly, since the first distance L1 is 40 mm and the second distance L2 is 50 mm, the first distance L1 and the second distance L2 satisfy 34.675 mm (=200 [µs]×346.75 [m/s]/2) <L1<L2<55 [mm] (the minimum size of the predetermined sheets). When the first distance L1 and the second distance L2 satisfy 34.675 mm (=200 [µs]×346.75 [m/s]/2)<L1<L2<55 [mm], affect on the accuracy in detection of the conveyed sheets PP, caused by the reverberation, can be prevented. That is, the reverberation, which is generated in the receiving side propagation unit 105 when the ultrasound are received by a specific opening among the receiving side openings 104A, 104B, 104C, does not remain in the receiving side propagation unit 105 until the ultrasound are received by an opening adjacent the specific opening after the specific opening receives the ultrasound. As shown in FIG. 7, if the reverberation remains until the ultrasound is received by the adjacent opening, the ultrasound received by the adjacent opening and the reverberations are overlapped. In this manner, if the ultrasound and the reverberation are overlapped, the accuracy in detecting the conveyed sheets PP is affected, as described below. That is, the overlap of the ultrasound and the reverberation causes the amplitude of the ultrasound to become large or small. Accordingly, the overlap of the ultrasound and the reverberation causes problems on the accuracy when detecting the attenuation of the ultrasound to determine whether a double feed occurred. Also, as shown in FIG. 7, since a break of the ultrasound received by the ultrasound receiver 106 through the receiving side openings 104A, 104B, 104C is unclear, even though it can determine whether the double feed occurred, it is difficult to specify whether the double feed occurs at any line among lines LA, LB and LC shown in FIG. 5. However, the first distance L1 and the second distance L2 satisfy following formula: 34.675 [mm] <L1<L2<55 [mm], thereby preventing the accuracy in detection of sheets PP conveyed from being affected by reverberation.

(Electrical Configuration of an Image Reading Apparatus)

Figure 8:
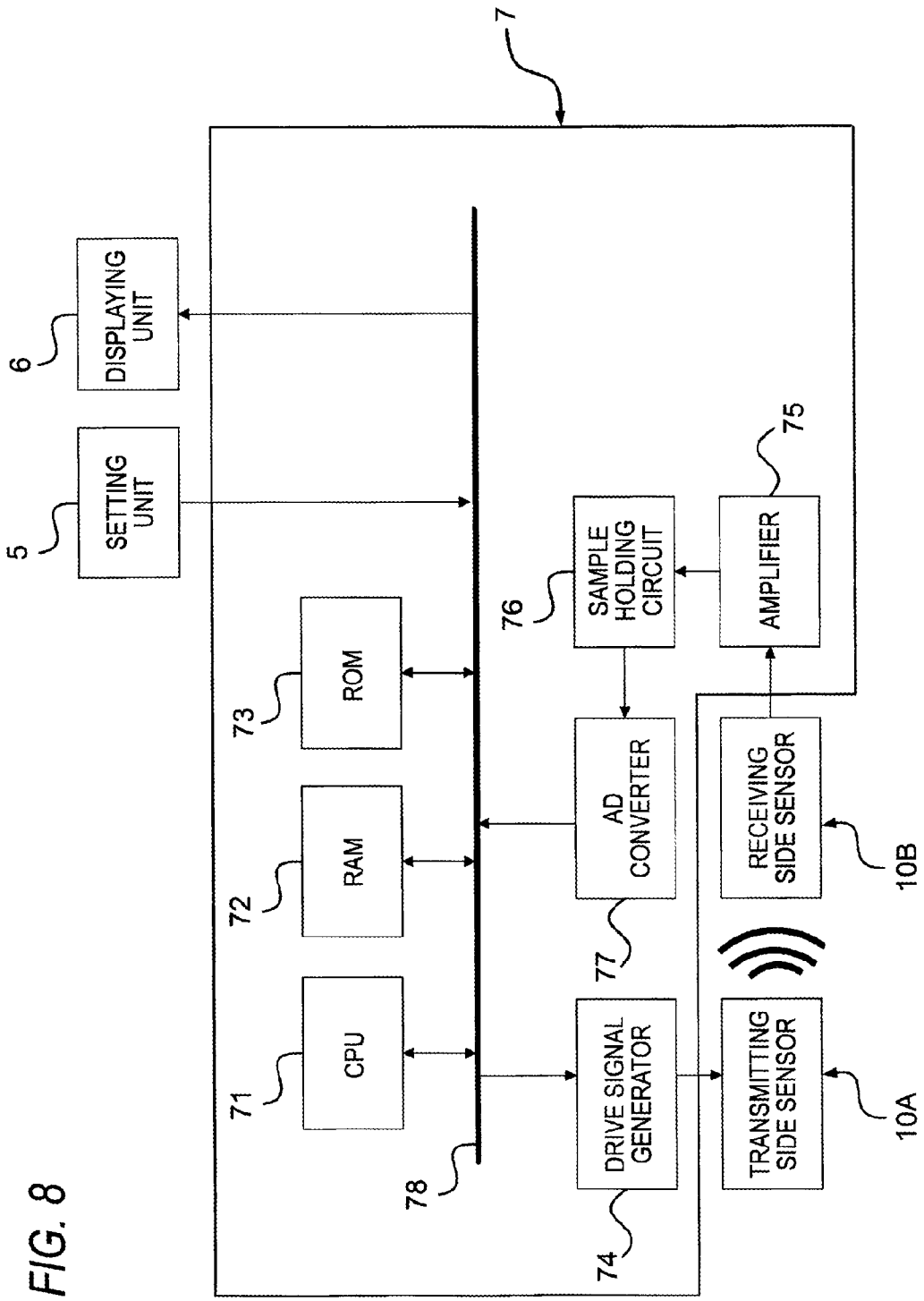
FIG. 8 is a block diagram illustrating an electrical configuration of the image reading apparatus.

The electrical configuration relating to sheet detection in the electrical configuration of the image reading apparatus 1 will be described with reference to FIG. 8. The control unit 7 shown in FIG. 8 includes a CPU 71, a RAM 72, a ROM 73, a drive signal generator 74, an amplifier 75, a sample holding circuit 76, an AD converter 77, and a bus 78.

The CPU 71 is a central processing unit, which performs various functions, provided in the image reading apparatus 1 by performing various information processing programs. The RAM 72 is a storage region storing temporarily various data such as amplitude data of the ultrasound received by the ultrasound receiver 106 and image data of sheet PP scanned by the reading sensor 36, etc. The ROM 73 stores various information processing programs executed by the CPU 71. The ROM 73 stores various data such as the time interval PR, the time period P1, the time period P2, the time period PS, and a amplitude value (hereinafter, referred to as threshold value) of the ultrasound received by the ultrasound receiver 106 through sheets PP when the double feed does not occur. The ROM 73 is configured by flash memory being nonvolatile memory. The CPU 71, the RAM 72 and the ROM 73 are respectively connected to the bus 78 for data communication, and the transmitting and receiving of various information are performed through the bus 78. The bus 78 is connected to a setting unit 5 and a displaying unit 6. When a user operates a designating button of the setting unit 5 for designating a position, to which a tag is attached, information of the designated position, to which the tag is attached, is supplied to the RAM 72 through the bus 78. If the CPU 71 determines that a double feed occurred, instruction information for notifying of the occurrence of a double feed is supplied to the displaying unit 6 through the bus 78.

The drive signal generator 74 generates a drive signal for driving the ultrasound transmitter 10A. The drive signal generator 74 supplies the generated drive signal to the ultrasound transmitter 10A. The ultrasound transmitter 10A generates the ultrasound based on the drive signal supplied. The ultrasound transmitter 10A, as shown in FIG. 3, transmits the generated ultrasound toward the ultrasound receiver 10B. When the sheets PP are conveyed between the ultrasound transmitter 10A and the ultrasound receiver 10B, the ultrasound are attenuated and received by the ultrasound receiver 10B.

The amplifier 75 amplifies analogue signals of the ultrasound received by the ultrasound receiver 10B. The sample holding circuit 76 performs sampling of a peak value of analogue signals of the ultrasound amplified by the amplifier 75. The sample holding circuit 76 temporarily maintains the sampled values with corresponding to the predetermined time points TS1, TS2, and TS3 in the time period PS indicated in FIG. 6C. The predetermined time points TS1, TS2, and TS3 are determined whenever the ultrasound are received by the ultrasound receiver 106 based on data of the time interval PR, the time period P1, the time period P2 and the time period PS having been stored in the ROM 73. Each of the predetermined time points TS1, TS2, and TS3 corresponds to time points that the ultrasound are received by the ultrasound receiver 106 through the receiving side openings 104B, 104A, and 104C. By sampling and temporarily maintaining the value by the sample holding circuit 76, the amplitude of the ultrasound received by the ultrasound receiver 106 is determined with corresponding to a time point, at which the ultrasound are received by the ultrasound receiver 106. The AD converter 77 converts analogue data of the ultrasound that is temporarily maintained by the sample holding circuit 76 to digital data. The RAM 72 temporarily stores data of the ultrasound having been converted to digital data by the AD converter 77 with corresponding to a time point, at which the ultrasound are received by the ultrasound receiver 106. That is, as shown in FIG. 6C, the RAM 72 stores three of the derived ultrasound based on one the ultrasound generated by the ultrasound generator 101, with corresponding to time points TS1, TS2, and TS3 at each time interval PR.

(Operation Control of Image Reading Apparatus)

Figure 9:
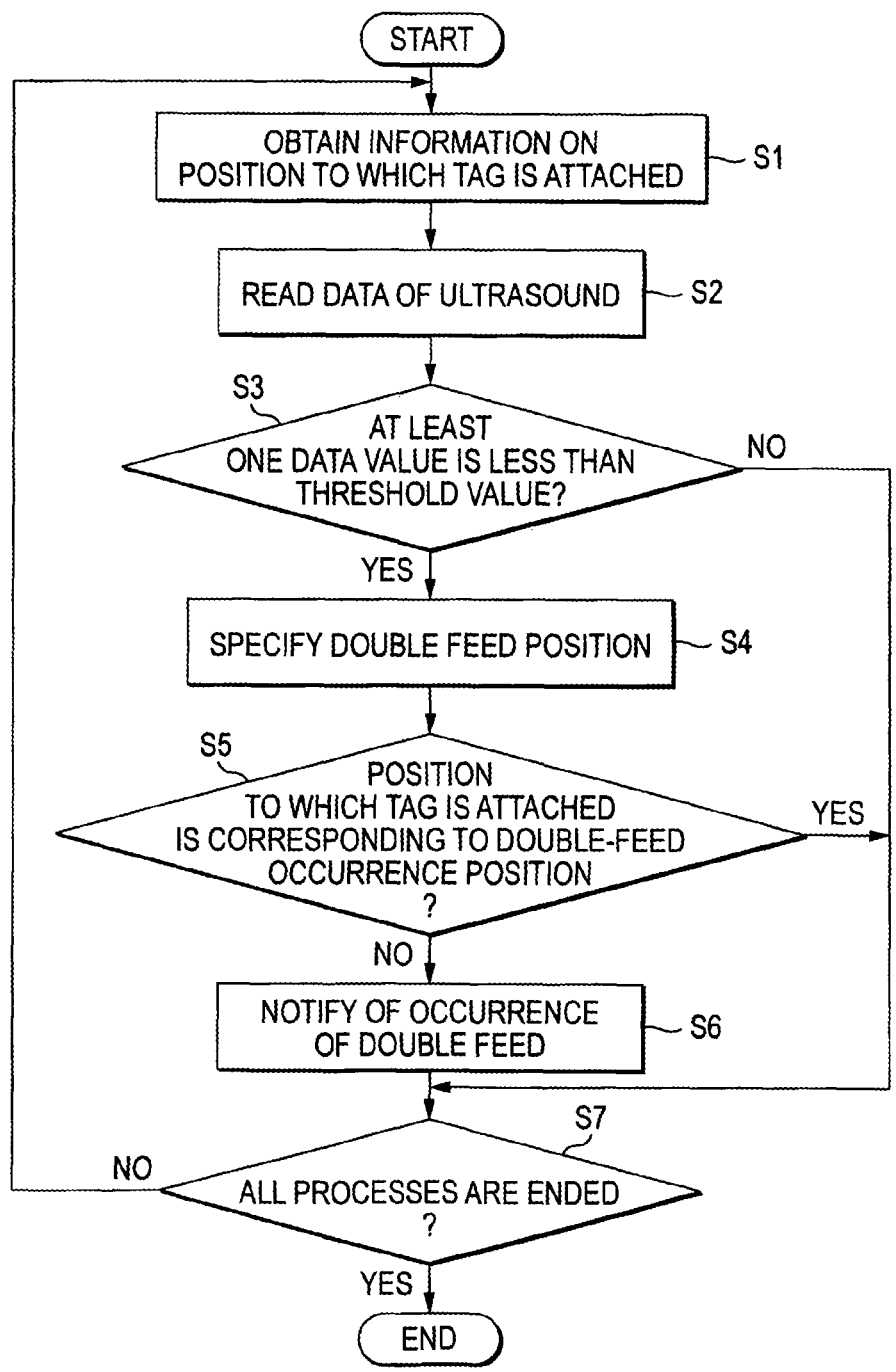
FIG. 9 is a flow chart illustrating an operation control of the image reading apparatus.

Hereinafter, operation control of the image reading apparatus 1 will be described with reference to FIG. 9. A series of operation controls is performed by the CPU 71 shown in FIG. 8. When a user pushes a power switch of the setting unit 5, instruction of power ON is supplied from the setting unit 5 to the CPU 71. When the instruction of power ON is supplied to the CPU 71, the image reading apparatus 1 is driven. When the operation of the image reading apparatus 1 is started, the detection of sheet PP by the detector 10 and the image reading of sheet PP by the reading sensor 36 are performed. When the operation of the image reading apparatus 1 is started, the analogue signal of the ultrasound received by the ultrasound receiver 10B is amplified by the amplifier 75. When the amplification is performed, the sampling and the temporary maintenance of peak value of analogue signal of the amplified ultrasound are performed by the sample holding circuit 76. When the sampling and the temporary maintenance are performed, the analogue data of the ultrasound temporarily maintained by the sample holding circuit 76 is converted to digital data by the AD converter 77. The data of the ultrasound having been converted to digital data is temporarily stored in the RAM 72 with corresponding to time points TS1, TS2, and TS3. A series of operation controls will be described below are processing performed by the CPU 71 thereafter.

in the processing shown in FIG. 9, information of a position, to which a tag stored in the RAM 72 is attached, is obtained (step S1, hereinafter, referred to as S1). If the information of the position, to which a tag is attached, is obtained, data of the ultrasound stored in the RAM 72 is read out from the RAM 72 together with time points TS1, TS2 and TS3 (S2). The read data of the ultrasound is compared with the threshold value of amplitude value of the ultrasound obtained through sheets PP when the double feed does not occur, which is stored in the ROM 73. In more detail, it is determined whether at least one data value of the three data value of the ultrasound received by the ultrasound receiver 106 is lower than the threshold value stored in the ROM 73 or not, in the time interval PR after one ultrasound is generated by the ultrasound generator 101 (S3). That is, it is determined whether the attenuation of the ultrasound occurs due to the occurrence of double feed at any one of the lines LA, LB and LC shown in FIG. 5. If all of the data of the three ultrasound are determined as being more than the threshold value stored in the ROM 73 (S3: No), the processing moves to S7. If at least one data value of the three ultrasound data is determined as being less than the threshold value stored in the ROM 73 (S3: YES), a position where double feed occurred is specified (S4) from the time points TS1, TS2 and TS3 corresponding to data of the ultrasound having a value determined as being less than the threshold value. That is, the line on which double feed occurs is specified among the lines LA, LB and LC. If a position is specified as the double feed being occurred, it is determined whether the position, to which the tag obtained has been attached in S1, corresponds to the double feed position having been specified in S4 (S5). If the position, to which tag has been attached, is determined as not being corresponding to the position double feed has occurred (S5: NO), it notifies that double feed has occurred (S6). In more detail, instruction information for notifying of occurrence of the double feed is supplied to the displaying unit 6 through the bus 78. The displaying unit 6 displays a message such as "occurrence of double feed" based on the instruction information supplied. If the occurrence of double feed is notified, the processing proceeds to S7. In S5, if the position, to which a tag has been attached, is determined as corresponding to the position where double feed has occurred (S5: YES), the processing moves to S7. If the tag is attached to the sheet PP, the ultrasound are attenuated when the ultrasound are transmitted to the position to which the tag has been attached. Accordingly, when the tag is attached, the CPU 71 may make an error detection that double feed has occurred. However, in S5, the image reading apparatus according to the illustrative embodiment compares the position, to which a tag is attached in S1, with the double feed position specified in S4, thereby preventing the error detection of the double feed. Accordingly, it can be prevented that a double feed is notified in error in S6 caused by the error detection of the double feed due to the attachment of tag. When the processing proceeds to S7, it is determined whether all processes of the operation control of the image reading apparatus 1 have ended (S7). In more detail, it is determined whether instruction of power OFF has been supplied from the setting unit 5. When it is determined that all of the processes have not yet ended (S7: NO), the processing is returned to S1. When it is determined that all of the processes have ended (S7: YES), all of the processes shown in FIG. 9 end.

According to the illustrative embodiment, even when various sized sheets are conveyed, the transmitting timing control of the ultrasound is not required and the ultrasound received by the ultrasound receiver is identified by the first determining unit based on the amplitude of ultrasound and a time point of receiving the ultrasound. Further, even when various sized sheets are conveyed, the apparatus can detect whether there are sheets being conveyed and the double feed occurred without the transmitting timing control of the ultrasound.

In the illustrative embodiment, since each of the receiving side openings is disposed at the same position as the transmitting side openings in the Y-direction, the ultrasound having a high straightness can be received accurately by the receiving side openings.

In the illustrative embodiment, one of the transmitting side openings disposed at the same position as the ultrasound generator is provide at the same position as one of the receiving side openings disposed at the same position as the ultrasound receiver. Accordingly, it is possible to reduce the time for determining the amplitude of the ultrasound with corresponding to the time point that the ultrasound is received by the ultrasound receiver.

According to the illustrative embodiment, the transmitting side opening and receiving side opening have three openings. Accordingly, even when various sized sheets are conveyed, the apparatus may accurately detect whether there are sheets being conveyed and the double feed occurred.

According to the illustrative embodiment, since the reverberation does not remain until the ultrasound is received by an opening adjacent to the specific opening after the specific opening receives the ultrasound. The reverberation does not affect the accuracy in detecting a sheet being conveyed.

According to the illustrative embodiment, even when a sheet having the shortest length in the arrangement direction is conveyed with overlapping another sheet, the apparatus can accurately detect whether there are sheets being conveyed and whether the double feed occurred.

According to the illustrative embodiment, the transmitting side propagation unit, transmitting side opening, the receiving side propagation unit, and the receiving side opening is configured by the sound propagation pipes. Accordingly, the number of parts can be reduced in the transmitting side propagation unit, the transmitting side opening, the receiving side propagation unit, and the receiving side opening, respectively, compared with the case where the parts are separately used for each of them.

[JP0063]

(Illustrative Modified Embodiment)

The present invention is not limited to the illustrative embodiment, but modifications may be made without departing from the spirit of the present invention. Hereinafter, illustrative modifications will be described. In the illustrative modifications, same numeral indicates same parts likewise with the illustrative embodiment.

According to the illustrative embodiment, the detector 10 includes the transmitting side openings 103A, 103E and 103C, and the receiving side openings 104A, 104B and 104C. However, the present invention is not limited thereto, the detector 10 may include two transmitting side openings 203A, 203B and two receiving side openings 204A, 204B, as shown in FIG. 10A. Meanwhile, the detector 10 may include several number of transmitting side openings 303A to 303 N and receiving side openings 304A to 304N, as shown in FIG. 10B.

Figure 10E:
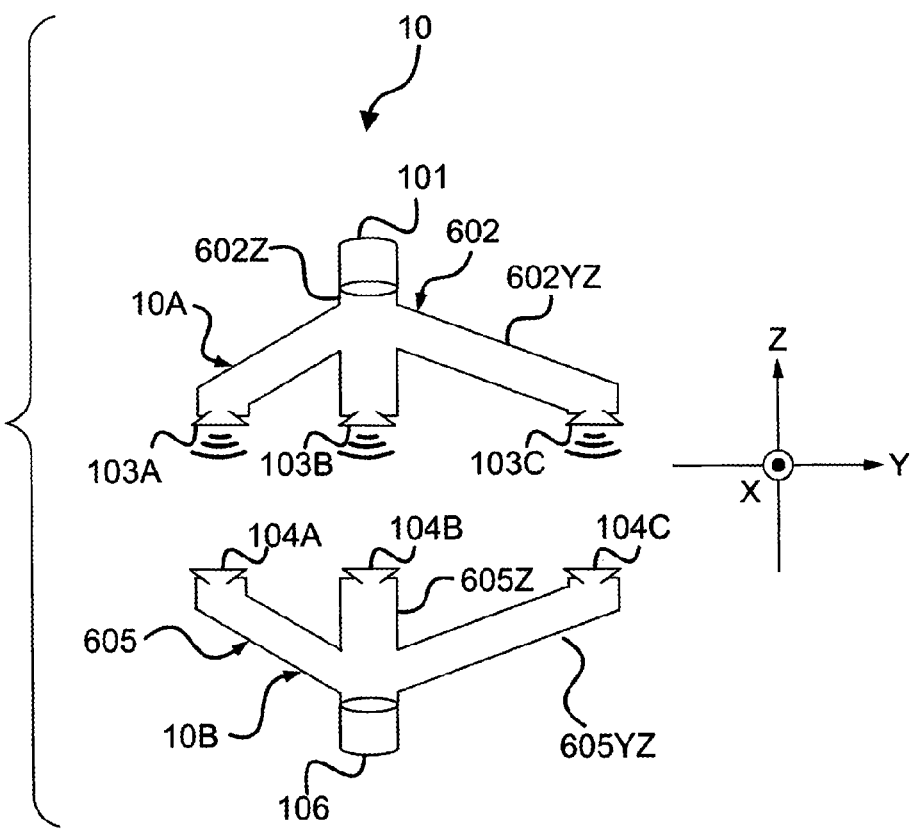
FIG. 10E is a front view illustrating the detecting unit according to a modified embodiment of the present invention.

In the illustrative embodiment, the transmitting side propagation unit 102 and the receiving side propagation unit 105 are extended in the Y-direction, as shown in FIG. 3. However, the present invention is not limited thereto, the present invention is not limited thereto, as shown in FIG. 10 C and FIG. 10D, the propagation unit 402, 405, 502 and 505 may include, respectively, extending portions 402Z, 405Z, 502Z and 505Z, which are extended in the Z-direction, and extending portions 402Y, 405Y, 502Y and 505Y, which are extended in the Y-axis. Further, as shown in FIG. 10E, propagation units 602 and 605 may include extending portions 602Z and 605Z which are extended in the Z-direction and extending portions 602YZ and 605YZ which are extended in an inclined direction on a Y-Z plane.

Figure 10F:
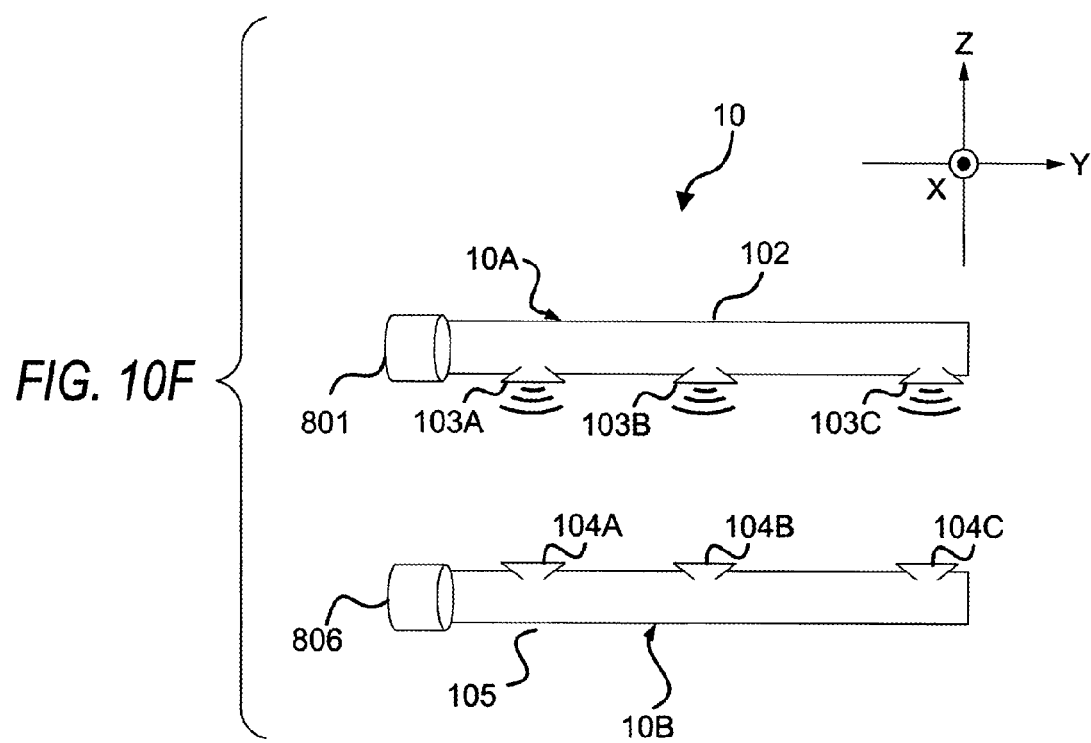
FIG. 10F is a front view illustrating the detecting unit according to a modified embodiment of the present invention.

In the illustrative embodiment, the ultrasound generator 101 is arranged in a positive direction of the Z-axis of the transmitting side openings 103A, 103B, 103C, and the ultrasound receiver 106 is arranged in a negative direction of the Z-axis of the receiving side openings 104A, 104B and 104C. However, the present invention is not limited thereto, as shown in FIG. 10F, the ultrasound generator 801 may be arranged in a negative direction of the Y-axis of the transmitting side openings 103A, 103B, 103C, and the ultrasound receiver 806 may be arranged in a negative direction of the Y-axis of the receiving side openings 104A, 104B and 104C, Likewise, the ultrasound generator 801 may be arranged in a positive direction of the Y-axis of the transmitting side openings 103A, 103B, 103C, and the ultrasound receiver 806 may be arranged in a positive direction of the Y-axis of the receiving side openings 104A, 104B and 104C.

Figure 11:
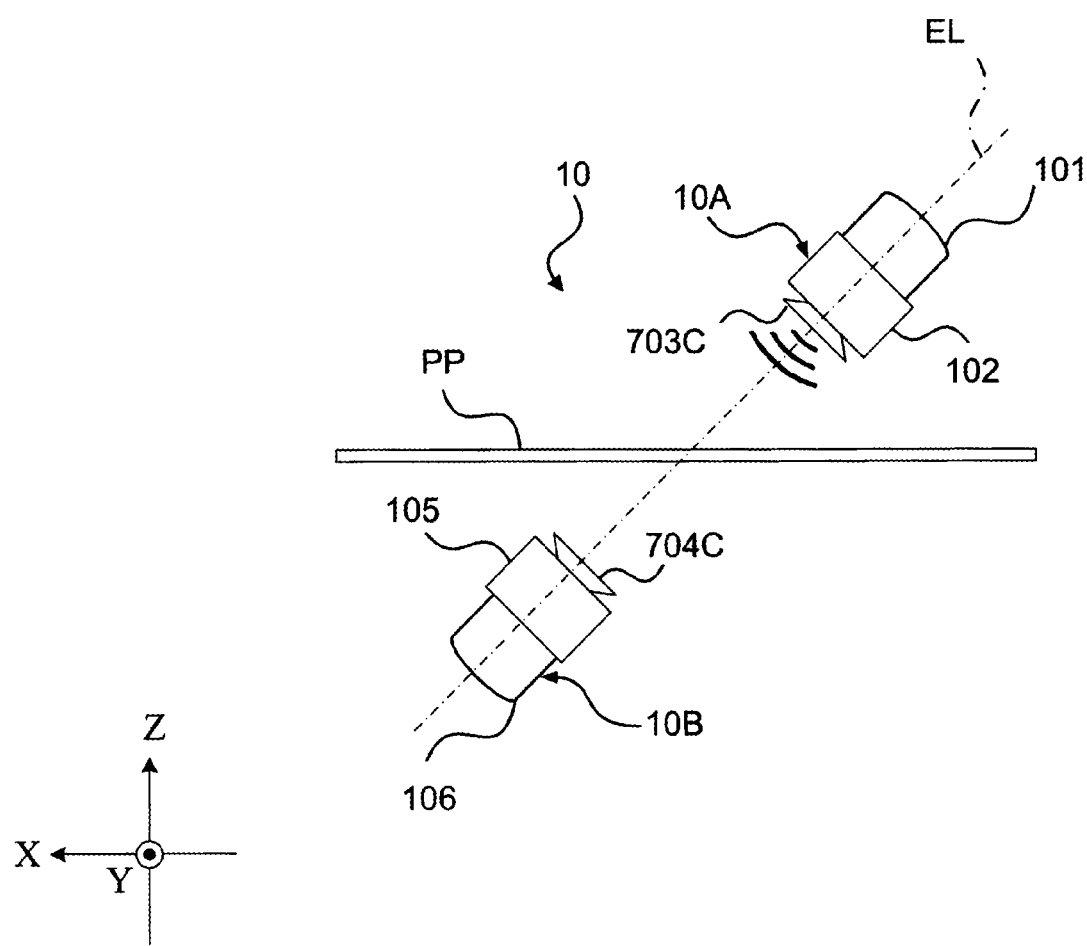
FIG. 11 is a side view illustrating the detecting unit according to a modified embodiment of the present invention.

In the illustrative embodiment, as shown in FIG. 4, the ultrasound transmitter 10A and the ultrasound receiver 10B are arranged at the same position in an X-axis direction. However, the present invention is not limited thereto, as shown in FIG. 11, the ultrasound transmitter 10A and the ultrasound receiver 10B may be arranged so that line EL connecting the transmitting side opening 703C and the receiving side opening 704C obliquely intersects a plane of the sheet PP. In this case, the ultrasound transmitter and ultrasound receiver other than the transmitting side opening 703C and the receiving side opening 704C may be arranged so that a line connecting the transmitting side openings and the receiving side openings obliquely intersects a plane of sheet PP. Meanwhile, the wording "obliquely cross" indicates a crossing at a specific angle so that a reflected wave of the ultrasound is not to be returned to the ultrasound transmitter 10A. For example, the cross angle may be set based on geometrical conditions such as opening sizes of the transmitting side openings 103A, 103B, 103C, distances from the reflecting sheet, or reflecting aspects of reflected waves, etc.

Accordingly, it enables to prevent the amplitude of the ultrasound received by the ultrasound receiver from becoming unstable due to the effect of the reflected wave. Accordingly, the apparatus can detect whether sheets is accurately conveyed and whether the double feed occurred, compared with a case where the line of connecting the transmitter side opening and the receiving side opening intersects at right angles to the conveyed sheet.

In the illustrative embodiment, the transmitting side propagation unit 102, the transmitting openings 103A, 103B, 103C, receiving side propagation unit 105 and receiving side openings 104A, 104B, 104C are configured by sound propagation pipe, which has a hollow structure and is made of a hard plastic material, configured to propagate ultrasound along them. However, the present invention is not limited thereto, the transmitting side propagation unit and receiving side propagation unit may be made of solid elements, not the hollow structure. Accordingly, the ultrasound can be transferred in an arrangement direction.

In the illustrative embodiment, the image reading apparatus is exemplified with a sheet feed scanner, but the present invention is not limited thereto. For example, the image reading apparatus may be a scanning section of a multi functional apparatus having a facsimile function and an automatically conveying function and so on. In addition, the detector may be used in detecting whether there is a double feed in a sheet feed mechanism of a printing machine.

In the present aspect, each of the receiving side openings 104A, 104B, 104C are arranged at the same position as the transmitting side openings 103A, 103B, 103C in the Y-axis direction. However, the present invention is not limited thereto, the receiving side openings 104A, 104B, 104C may be disposed to displace about 0.1 mm from the transmitting side openings 103A, 103B, 103C in the Y-axis direction, respectively. In other words, each of the receiving side openings 104A, 104B, 104C may be disposed at a position, where the ultrasound transmitted from at least the transmitting side openings 103A, 103B, 103C can be received, in the Y-axis direction.

In the illustrative embodiment, the detector 10 informs of the occurrence of the double feed by the displaying unit 6 when detected the double feed. However, the present invention is not limited thereto, but the detector may inform of the double feed, by means of sound or by stopping the scanning operation thereof.

In the illustrative embodiment, the ultrasound generator 101 and the ultrasound receiver 106 are arranged at the same position in a Y-axis direction. However, the present invention is not limited thereto, the ultrasound generator 101 and the ultrasound receiver 106 may be arranged a positions where they are displaced to each other in the Y-axis direction within the scope of not disturbing the detection of whether there is the double feed.

What is claimed is:

1. A sheet detecting device detecting a sheet being conveyed, comprising:
   an ultrasound generator generating ultrasound;
   a transmitting side opening, which includes a first opening and a second opening to transmit the ultrasound, wherein the transmitting side openings are arranged in an arrangement direction being vertical to a conveying direction, in which the sheet is to be conveyed, and provided above a face being parallel to a plane of the sheet to be conveyed;
   a transmitting side propagation unit, which is connected to the ultrasound generator and each of the transmitting side openings, and which transfers the ultrasound generated by the ultrasound generator to the transmitting side opening;
   a receiving side opening, which includes a third opening and a fourth opening to receives the ultrasound transmitted from the first opening and the second opening, wherein the receiving side openings are arranged in the arrangement direction to face the transmitting side opening;

an ultrasound receiver receiving the ultrasound received by the receiving side openings;

a receiving side propagation unit, which is connected to each of the receiving side openings and the ultrasound receiver, and which transfers the ultrasound received by the receiving side opening to the ultrasound receiver; and a first determining unit, which determines amplitude of the ultrasound received by the ultrasound receiver with corresponding to a time point, in which the ultrasound is received by the ultrasound receiver, wherein a first distance from the ultrasound generator to the first opening is different from a second distance from the ultrasound generator to the second opening, and wherein a third distance from the ultrasound receiver to the third opening is different from a fourth distance from the ultrasound receiver to the fourth opening.

2. The sheet detecting device according to claim 1, wherein the first opening and the third opening are disposed at the same position in the arrangement direction, and wherein the second opening and the fourth opening are disposed at the same position in the arrangement direction.

3. The sheet detecting device according to claim 1, wherein either one of the first opening and the second opening is disposed at the same position as the ultrasound generator in the arrangement direction, and wherein either one of the third opening and the fourth opening receives the ultrasound transmitted from the either one of the first opening and the second opening, which is disposed at the same position as the ultrasound generator in the arrangement direction and is disposed at the same position as the ultrasound receiver in the arrangement direction.

4. The sheet detecting device according to claim 1, wherein the transmitting side opening includes at least three openings including the first opening and the second opening, which are connected to the transmitting side propagation unit, to transmit the ultrasound transferred by the transmitting side propagation unit forward to the sheet, and wherein the receiving side opening includes at least three openings including third opening and the fourth opening, to receive respectively the ultrasound transmitted from the at least three openings included in the transmitting side opening.

5. The sheet detecting device according to claim 4, wherein a first adjacent distance is a distance between two adjacent openings of the at least three transmitting side openings, wherein a second adjacent distance is a distance between two adjacent openings of the at least three receiving side openings, and wherein each of the first adjacent distance and the second adjacent distance is larger than a half of a value obtained by multiplying reverberation time, which is depending on a configuration of both of the transmitting side propagation unit and the receiving side propagation unit, by sound velocity.

6. The sheet detecting device according to claim 4, wherein a first adjacent distance between two adjacent openings of the at least three transmitting side openings is smaller than a length in the arrangement direction of a smallest sheet, which has the smallest length in predetermined various sized sheets to be conveyed.

7. The sheet detecting device according to claim 1, wherein a facing direction, in which the transmitting side opening and the receiving side opening faces to each other, is obliquely intersected with the conveying direction.

8. The sheet detecting device according to claim 1, wherein the transmitting side propagation unit and the transmitting side opening are configured by a first single sound propagation pipe, and wherein the receiving side propagation unit and the receiving side opening are configured by a second single sound propagation pipe.

9. The sheet detecting device according to claim 1, wherein the transmitting side propagation unit and the receiving side propagation unit are made of solid element.

10. A double feed determining device, comprising:

a sheet detecting device according to claim 1; and a second determining unit, which determines whether the double feed occurred, based on the amplitude of the ultrasound determined by the first determining unit.

11. The double feed determining device according to claim 10, wherein an amplitude of the ultrasound, which is to be received by the ultrasound receiver through one sheet, is predetermined as a reference value, and wherein the second determining unit determines whether the amplitude of the ultrasound determined by the first determining unit is less than the reference value and whether the double feed occurred.

12. An image reading apparatus, comprising:

a sheet detecting device according to claim 1;

a conveying unit conveying the sheet;

a separation unit separating a plurality of the sheets to be conveyed by the conveying unit into at least one sheet; and a reading unit scanning an image of the sheet, which is conveyed by the conveying unit and is separated by the separation unit.

13. An image reading apparatus, comprising:

a double feed determining device according to claim 10;

a conveying unit conveying the sheet;

a separation unit separating a plurality of the sheets to be conveyed by the conveying unit into at least one sheet; and a reading unit scanning an image of the sheet, which is conveyed by the conveying unit and separated by the separation unit.

* * * * *